United States Patent Office 3,297,660
Patented Jan. 10, 1967

3,297,660
CURING MERCAPTAN MODIFIED CHLORO-
PRENE POLYMERS USING MERCAPTAN
SUBSTITUTED CARBOXYLIC ACIDS
Richard O. Becker, Wilmington, Del., assignor to E. I.
du Pont de Nemours and Company, Wilmington, Del.,
a corporation of Delaware
No Drawing. Filed May 22, 1962, Ser. No. 196,602
8 Claims. (Cl. 260—79.5)

This invention relates to a process for curing chloroprene polymers and more particularly to an improved process for curing mercaptan-modified chloroprene polymers wherein certain mercapto-substituted carboxylic acids are used to improve the properties of the cured polymer.

With many types of chloroprene polymers, good vulcanizates may be obtained by incorporating certain metal oxides, such as zinc oxide and magnesia, into the polymer and heating to effect curing. In the case of chloroprene polymers which have been prepared in the presence of aliphatic mercaptans, metal oxides act slowly and do not produce a high state of cure even after long periods of heating. When curing chloroprene polymers of this type, it is necessary to use vulcanization accelerators which increase the rate of cure and improve the properties of the vulcanizates. However, because of the activity of the usual vulcanization accelerators at relatively low temperature, care must be taken to prevent premature vulcanization (scorching) during the process. Furthermore, there is room for improvement in rate of cure and in the properties of the vulcanizates obtained using the conventional organic vulcanization accelerators.

It is an object of the present invention to provide an improved process for curing mercaptan-modified chloroprene polymers. A further object is to provide a process for curing such chloroprene polymers wherein the properties of the polymer are improved by incorporation into the chloroprene polymer prior to curing of certain mercapto-substituted carboxylic acids. A still further object is to provide a curable mercaptan-modified chloroprene polymer composition. Other objects will appear hereinafter.

These and other objects of this invention are accomplished by providing a curable composition comprising a mercaptan-modified chloroprene polymer, zinc oxide, magnesium oxide, a vulcanization accelerator and from about 0.2 to 3.0 parts by weight per 100 parts by weight of said polymer of a carboxylic acid selected from the group consisting of mercaptoacetic acid and 3-mercaptopropionic acid, with the proviso that the vulcanization accelerator be selected from the group consisting of salicyclic acid; the di-o-tolylguanidine salt of dicatechol borate; trialkylthioureas in which the alkyl radicals contain from one to two carbon atoms; and cyclic thioureas of the structure

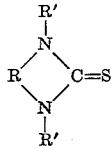

wherein R is selected from the group consisting of an aliphatic hydrocarbon radical and a cycloaliphatic hydrocarbon radical which contains from 2 to 24 carbon atoms and in which the thiourea ring contains from 3 to 5 carbon atoms and R' is selected from the group consisting of hydrogen and a methyl radical.

It is well known in the art to vulcanize or cure mercaptan-modified chloroprene polymers in the presence of zinc oxide, magnesium oxide and a vulcanization accelerator. The essence of the present invention resides in adding a certain mercapto-substituted carboxylic acid to the chloroprene polymer prior to curing. The resulting curable composition may then be cured by any of the well-known techniques as will be more particularly described hereinafter.

The polymers which may be cured according to the present invention are the polymers of chloroprene (2-chloro-1,3-butadiene) and copolymers of chloroprene in which chloroprene is the major component. The copolymers are those of chloroprene with diolefinic compounds or vinyl compounds such as acrylonitrile, 1,3-butadiene, isoprene, 2,3-dichloro-1,3-butadiene, and styrene in which copolymers chloroprene comprises the predominant monomer (50% or more by weight). By mercaptan-modified is meant that the polymers have been prepared by polymerizing the monomer or monomers in an aqueous emulsion in the presence of about 0.1 to 4.0 percent by weight, based on total monomer weight, of an alkyl mercaptan containing from four to eighteen carbon atoms in the alkyl radical. The preferred curable polymers of this type are prepared in such a way that the polymer is a sol-type polymer; that is, the polymerization has been arrested while the polymer is still soluble in such solvents as benzene and toluene.

The preparation of these chloroprene polymers is well-known in the art. See, for example, the disclosures in U.S. 2,494,087, U.S. 2,567,117, U.S. 2,831,842 and U.S. 2,914,497. The polymerization may be stopped by adding any of the conventional "short-stopping" agents, such as phenothiazine and p-tert-butyl-catechol, as disclosed in U.S. 2,576,009. The unreacted monomers may be stripped from the polymer latex by known methods, such as by turbannular steam stripping as described in U.S. 2,467,769. The polymer may be isolated by conventional means, such as by a freezing technique as disclosed in U.S. 2,187,146 or by drum drying as disclosed in U.S. 2,914,497.

Zinc oxide and magnesium oxide are well-known chloroprene polymer curing agents. The magnesium oxide may be used in amounts ranging from about 0.5 to 15 parts by weight per 100 parts by weight of chloroprene polymer with from about 4 to 5 parts by weight being preferred. The zinc oxide may be used in amounts ranging from about 2 to 15 parts by weight per 100 parts by weight of chloroprene polymer with from about 4 to 5 parts by weight being preferred.

The vulcanization accelerator employed in the present invention is selected from the group consisting of salicyclic acid, the di-o-tolylguanidine salt of dicatechol borate, trialkylthioureas and cyclic thioureas. The trialkylthiourea accelerators include trimethylthiourea, triethylthiourea, and mixed dimethylethyl- and diethylmethylthioureas. The cyclic thioureas are disclosed in U.S. 2,544,746. Examples of suitable cyclic thiourea vulcanizing agents are 2-imidazolidinethione (frequently called ethylenethiourea or 2-mercapto-2-imidazoline), 4-methyl-2 - imidazolidinethione, tetrahydro-2(1H)-pyrimidinethione, 1,3-dimethyl-2-imidazolidinethione, 2,4-diazabicyclo-[3.3.1]nonane-3-thione, 4,5-diundecyl-2-imidazolidinethione and 3,4-dihydro-4,4,6-trimethyl-2(1H)-pyrimidinethione. Of these cyclic thioureas, the preferred compounds are those of the formula:

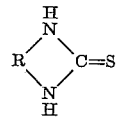

in which R is an aliphatic radical containing 2 to 6 carbon atoms and in which the thiourea ring contains 3 to 4 carbon atoms. The most preferred compounds of the cyclic thioureas are 2-imidazolidinethione and 3,4-dihydro-4,4,6-trimethyl-2(1H)-pyrimidinethione because of their ready availability. Mixtures of these vulcanization accelerators may be employed if desired.

The amounts of accelerator used are within the limits usually employed in the curing of chloroprene polymers and, in general, will range from 0.1 to 3 parts be weight per 100 parts of polymer.

The mercaptoacetic acid or 3-mercaptopropionic acid may be used in amounts ranging from 0.2 to 3 parts by weight per 100 parts by weight of chloroprene polymer. It is to be understood that mixtures of these acids may be used if desired. Less than about 0.2 part by weight of acid produces only slight improvement in the cured polymer composition. More than about 3 parts by weight may be used if desired, but is usually not required. The preferred amount of acid to be used ranges from about 0.5 to 1.0 part.

The mercapto acids used in the present invention may be added to the chloroprene polymer at any time prior to curing along with the other ingredients. Conventional techniques, such as blending on a roll mill or in a heavy-duty mixer of the Banbury type, may be used to incorporate the mercapto acid with the polymer.

Other conventionl compounding ingredients may be added to the polymer composition. These include fillers, reinforcing agents, and pigments, such as clay, carbon black, whiting, titanium dioxide, and calcium silicate. Plasticizers such as hydrocarbon oils and esters may be used, if desired. Any of the conventional antioxidants used with chloroprene polymers may be used.

Curing of the compounded chloroprene polymer composition may be carried out by the usual techniques, as, for example, in molds under pressure, or the shaped articles may be treated in a hot liquid bath. Temperatures for the curing can range from 125° C. to 175° C. Curing at from 140° C. to 175° C. is generally preferred.

The specific advantages gained by incorporation of the mercapto-carboxylic acids in the chloroprene polymer vary somewhat with the specific vulcanization accelerator that is being used. In general, the advantages gained include one or more of the following:

(1) The processing safety is increased.
(2) The compression set of the cured polymer is decreased.
(3) The curing process is accelerated.
(4) The oil resistance is increased.

When using a trialkylthiourea or a cyclic thiourea, all four of these advantages can be realized. When using salicyclic acid as the accelerator, the presence of the mercapto-carboxylic acid greatly increases the processing safety and somewhat increases the compression set. With the di-o-tolylguanidine salt of dicathechol borate, processing safety is increased, and oil resistance and rate of cure are somewhat improved. Some advantages may also be gained in using the mercapto-acids with some of the other conventional vulcanization accelerators, such as a system comprising 0.5 to 1 part of tetramethylthiuram monosulfide [bis(dimethylthiocarbamoyl) sulfide], 1 to 3 parts of di-o-toylyguanidine, and 0.5 to 1 part of sulfur, all parts being by weight per 100 parts of chloroprene polymer.

The following examples will better illustrate the nature of the present invention; however, the invention is not intended to be limited to these examples. Parts are by weight unless otherwise indicated.

In the following examples the chloroprene polymer used is prepared by the emulsion polymerization of chloroprene in the presence of dodecyl mercaptan as described in Example 6 of U.S. 2,494,087. The compounding recipes are shown in the various examples. The compounded stock is cured in a mold under pressure at 153° C. for the times indicated. The tensile properties are measured according to ASTM Method D 412–51 T. The Mooney scorch data are obtained at 121° C. by ASTM Method D 1646–59 T. Increased processing safety is indicated by an increased time required for a 10-point rise from the minimum reading. Compression set is measured by ASTM Method D 395–55, Method B. The samples used for determining compression set are cured for 25 minutes at 153° C. Volume increase in oil is determined on samples cured for 15 minutes at 153° C. They are immersed in ASTM No. 3 oil for 70 hours at 100° C. Increase in resistance to oil is indicated by a lower percent of volume increase of the polymer during the immersion in the oil when compared with that of the control sample containing no mercapto-acid. Increase in rate of cure is indicated by a higher modulus at 300 percent elongation, particularly at the shorter curing periods.

EXAMPLE 1

The recipe used in compounding polychloroprene in this example is:

| | Parts by weight |
|---|---|
| Polychloroprene | 100 |
| Stearic acid | 0.5 |
| 2,2'-methylenebis(6-t-butyl-p-cresol) | 2 |
| Magnesia | 4 |
| Titanium dioxide | 10 |
| Clay | 90 |
| Hydrocarbon oil | 12 |
| Petrolatum | 1 |
| Paraffin wax | 1 |
| Zinc oxide | 5 |
| 2-imidazolidinethione | 0.75 |
| Mercapto-acid as shown. | |

The following table shows the results of the various tests:

*Table I*

| | A | B | C | D |
|---|---|---|---|---|
| 3-mercaptopropionic acid | | 0.95 | | |
| Mercaptoacetic acid | | | 0.41 | 0.83 |
| Mooney Scorch: | | | | |
| Minimum reading | 19 | 19 | 20 | 20 |
| Minutes to 10-point rise | 18 | 25 | 20 | 27 |
| Compression Set, Percent: | | | | |
| 22 hours at 70° C | 45 | 29 | 24 | 25 |
| 70 hours at 100° C | 82 | 56 | 62 | 53 |
| Modulus at 300% elongation, p.s.i., cured at 153° C. for the following times: | | | | |
| 7.5 min | 750 | 1,350 | 1,100 | 1,200 |
| 15 min | 825 | 1,500 | 1,150 | 1,350 |
| 30 min | 850 | 1,600 | 1,150 | 1,350 |
| Volume increase in oil, percent | 65 | 52 | 54 | 51 |

EXAMPLE 2

The recipe used in compounding polychloroprene in this example is:

| | Parts by weight |
|---|---|
| Polychloroprene | 100 |
| N-phenyl-1-naphthylamine | 2 |
| Magnesia | 4 |
| Semi-reinforcing furnace carbon black | 29 |
| Zinc oxide | 5 |
| 2-imidazolidinethione | as shown. |
| Mercaptoacetic acid | as shown. |

Table II shows the results of the various tests.

*Table II*

| | A | B | C | D | E | F | G |
|---|---|---|---|---|---|---|---|
| 2-imidazolidinethione, parts | 0.5 | 0.75 | 0.35 | 1.10 | 0.75 | 1.00 | 0.50 |
| Mercaptoacetic acid | None | 0.35 | 0.60 | 0.80 | 2.20 | 1.20 | 1.30 |
| Mooney Scorch: | | | | | | | |
| Minimum reading | 25 | 25 | 25 | 26 | 25 | 28 | 24 |
| Minutes to 10-point rise | 11 | 11 | 17 | 13 | 15 | 19 | 20 |
| Compression set, percent, 70 hours at 100° C | 37 | 25 | 25 | 30 | 30 | 32 | 31 |
| Modulus at 300% elongation, p.s.i., (cured 15 min. at 153° C.) | 1,500 | 2,300 | 1,900 | 2,400 | 2,250 | 2,550 | 2,000 |
| Volume increase in oil, percent | 96 | 82 | 90 | 76 | 80 | 75 | 81 |

EXAMPLE 3

The recipe used in compounding polychloroprene in this example is:

| | Parts by weight |
|---|---|
| Polychloroprene | 100 |
| N-phenyl-1-naphthylamine | 2 |
| Magnesia | 4 |
| Semi-reinforcing furnace black | 29 |
| Zinc oxide | 5 |
| Accelerator | as shown. |
| Mercaptoacetic acid | as shown. |

Table III which follows shows the results of the various tests. It can be seen from this Table that with every accelerator except the system of Columns G and H (which system is not included in the present invention) processing safety is increased when mercaptoacetic acid is included in the recipe, as evidenced by an increase in minutes to 10-point rise. Other advantages vary. There is a lowering of compression set, an increase in rate of cure (as shown by higher modulus) and an increase in resistance to oil (as shown by decrease in oil swell) when mercaptoacetic acid is used with trimethylthiourea. When used with the di-o-tolylguanidine salt of dicatechol borate, mercaptoacetic acid does not appreciably affect the compression set and oil swell, but does increase modulus. With salicylic acid, mercaptoacetic acid greatly increases processing safety but has no appreciable effect on modulus and oil swell and increases compression set. With the accelerator combination of Columns G and H, processing safety is decreased, but compression set, cure rate (as shown by modulus) and oil resistance are improved by the presence of the mercaptoacetic acid.

Table IV shows the results of the various tests.

TABLE IV

| | A | B |
|---|---|---|
| Mooney Scorch: | | |
|   Minimum reading | 25 | 24 |
|   Minutes to 10-point rise | 14 | 17 |
| Compression set, percent, 70 hrs. at 100° C | 45 | 40 |
| Modulus at 300% elongation, p.s.i., cured at 153° C. for the following times: | | |
|   7.5 min | 800 | 1,600 |
|   15 min | 1,300 | 2,000 |
|   30 min | 1,800 | 2,200 |

EXAMPLE 5

The recipe used in compounding polychloroprene in this example is the same as in Example 2. 0.5 parts by weight of 2-imidazolidonethione is used as the accelerator and mercaptoacetic acid is used in varying amounts as shown in the table. The results are shown in Table V.

Table V

| | A | B | C |
|---|---|---|---|
| Mercaptoacetic acid, parts | None | 0.1 | 0.2 |
| Mooney Scorch: | | | |
|   Minimum reading | 24 | 24 | 24 |
|   Minutes to 10-point rise | 12 | 12 | 13 |
| Compression set, percent, 70 hours at 100° C | 37 | 34 | 30 |
| Modulus at 300% elongation, p.s.i., cured at 153° C. for 15 minutes | 1,500 | 1,550 | 1,700 |
| Volume Increase in oil, percent | 96 | 94 | 30 |

Table III

| | A | B | C | D | E | F | G | H |
|---|---|---|---|---|---|---|---|---|
| Mercaptoacetic acid | | 0.8 | | 0.8 | | 0.8 | | 0.8 |
| Accelerator: | | | | | | | | |
|   Trimethylthiourea | 0.5 | 0.5 | | | | | | |
|   Di-o-tolylguanidine salt of dicatechol borate | | | 0.75 | 9.75 | | | | |
|   Salicyclic acid | | | | | 0.75 | 0.75 | | |
|   Tetramethylthiuram monosulfide | | | | | | | 0.5 | 0.5 |
|   Di-o-tolylguanidine | | | | | | | 0.5 | 0.5 |
|   Sulfur | | | | | | | 1 | 1 |
| Mooney Scorch: | | | | | | | | |
|   Minimum reading | 21 | 22 | 23 | 22 | 26 | 24 | 21 | 27 |
|   Minutes to 10-point rise | 21 | 41 | 21 | 32 | 9 | 35 | 45+ | 18 |
| Compression Set, percent, 70 hours at 100° C | 45 | 34 | 27 | 27 | 49 | 69 | 73 | 60 |
| Modulus at 300% elongation, p.s.i., (cured 15 min. at 153° C.) | 1,600 | 2,100 | 1,700 | 2,009 | 1,400 | 1,300 | 1,000 | 1,900 |
| Volume Increase in oil, percent | 91 | 82 | 87 | 85 | 119 | 123 | 109 | 96 |

EXAMPLE 4

The recipe used in compounding polychloroprene in this Example is:

| | Parts by weight | |
|---|---|---|
| | A | B |
| Polychloroprene | 100 | 100 |
| Antioxidant (a mixture of, by weight, 65% of N-phenyl-2-naphthylamine and 35% of N,N'-diphenyl-p-phenylenediamine) | 2 | 2 |
| Magnesia | 4 | 4 |
| Semi-reinforcing furnace black | 29 | 29 |
| Zinc oxide | 5 | 5 |
| 3,4-dihydro-4,4,6-trimethyl-2(1H)-pyrimidinethione | 1.2 | 1.2 |
| Mercaptocacetic acid | | 0.8 |

As many widely different embodiments of this invention may be made without departing from the spirit and scope thereof, it is to be understood that this invention is not limited to the specific embodiments thereof except as defined in the appended claims.

What is claimed is:

1. A curable composition comprising a mercaptan-modified chloroprene polymer, zinc oxide, magnesium oxide, a vulcanization accelerator and from about 0.2 to 3.0 parts by weight per 100 parts by weight of said polymer of a carboxylic acid selected from the group consisting of mercaptoacetic acid and 3-mercaptopropionic acid, with the proviso that the vulcanization accelerator be selected from the group consisting of salicylic acid, the di-o-tolylguanidine salt of dicatechol borate, trialkylthioureas in which the alkyl radicals contain from one to two carbon atoms, and cyclic thioureas of the structure

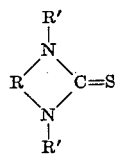

wherein R is selected from the group consisting of an aliphatic hydrocarbon radical and a cycloaliphatic hydrocarbon radical which contains from 2 to 24 carbon atoms and is selected so that the thiourea ring contains from 3 to 5 carbon atoms and R' is selected from the group consisting of hydrogen and a methyl radical.

2. A curable composition comprising about 100 parts by weight of a mercaptan-modified chloroprene polymer, 4 to 5 parts by weight of zinc oxide, 4 to 5 parts by weight of magnesium oxide, 0.1 to 3.0 parts by weight of 2-imidazolidinethione and 0.2 to 3.0 parts by weight of mercaptoacetic acid.

3. A curable composition comprising about 100 parts by weight of a mercaptan-modified chloroprene polymer, 4 to 5 parts by weight of zinc oxide, 4 to 5 parts by weight of magnesium oxide, 0.1 to 3.0 parts by weight of trimethylthiourea and 0.2 to 3.0 parts by weight of mercaptoacetic acid.

4. A curable composition comprising about 100 parts by weight of a mercaptan-modified chloroprene polymer, 4 to 5 parts by weight of zinc oxide, 4 to 5 parts by weight of magnesium oxide, 0.1 to 3.0 parts by weight of di-o-tolylguanidine sale of dicatechol borate and 0.2 to 3.0 parts by weight of mercaptoacetic acid.

5. In the vulcanization of mercaptan-modified chloroprene polymers in the presence of zinc oxide, magnesium oxide and a vulcanization accelerator, the improvement comprising adding to said chloroprene polymer before curing from about 0.2 to 3.0 parts by weight per 100 parts by weight of said polymer of a carboxylic acid selected from the group consisting of mercaptoacetic acid and 3-mercaptopropionic acid with the proviso that the vulcanization accelerator be selected from the group consisting of salicyclic acid; the di-o-tolylguanidine salt of dicatechol borate; trialkylthioureas in which the alkyl radicals contain from one to two carbon atoms; and cyclic thioureas of the structure

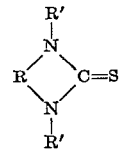

wherein R is selected from the group consisting of an aliphatic hydrocarbon radical and a cycloaliphatic hydrocarbon radical which contains from 2 to 24 carbon atoms and in which the thiourea ring contains from 3 to 5 carbon atoms and R' is selected from the group consisting of hydrogen and a methyl radical.

6. The process of claim 5 wherein the vulcanization accelerator is 2-imidazolidinethione and the carboxylic acid is mercaptoacetic acid.

7. The process of claim 5 wherein the vulcanization accelerator is trimethylthiourea and the carboxylic acid is mercaptoacetic acid.

8. The process of claim 5 wherein the vulcanization accelerator is di-o-tolylguanidine salt of dicatechol borate and the carboxylic acid is mercaptoacetic acid.

References Cited by the Examiner

UNITED STATES PATENTS

| | | | |
|---|---|---|---|
| 2,544,746 | 3/1951 | Baum | 260—79.5 |
| 2,662,874 | 12/1953 | Brown | 260—79.5 |
| 2,943,078 | 6/1960 | Bacon | 260—79.5 |

JOSEPH L. SCHOFER, *Primary Examiner.*

WILLIAM H. SHORT, *Examiner.*

M. P. HENDRICKSON, *Assistant Examiner.*